United States Patent [19]

Andersson et al.

[11] Patent Number: 4,889,592
[45] Date of Patent: Dec. 26, 1989

[54] PROCESS AND APPARATUS FOR CONTROL IN BURNING AND SLAKING OF LIME AND CAUSTICIZING

[75] Inventors: Birgitta S. Andersson, Enebyberg; Malin C. Zethraeus, Johanneshov; Torbjörn Herngren, Älvsjö; Jan-Erik V. Gustafsson, Täby, all of Sweden

[73] Assignee: STFI, Sweden

[21] Appl. No.: 110,690

[22] PCT Filed: Feb. 2, 1987

[86] PCT No.: PCT/SE87/00044
§ 371 Date: Nov. 18, 1987
§ 102(e) Date: Nov. 18, 1987

[87] PCT Pub. No.: WO87/04738
PCT Pub. Date: Aug. 13, 1987

[30] Foreign Application Priority Data
Feb. 11, 1986 [SE] Sweden .................. 8600597

[51] Int. Cl.[4] .................. D21C 11/04; C04B 2/04
[52] U.S. Cl. .................. 162/29; 162/30.11; 162/49; 162/240; 162/DIG. 10; 422/108; 422/111; 422/185; 423/175; 423/183; 423/DIG. 3
[58] Field of Search .............. 423/175, 177, 183, 207, 423/DIG. 3; 422/62, 80, 108, 111, 68; 162/29, 30.1, 30.11, 49, DIG. 10, 240

[56] References Cited

U.S. PATENT DOCUMENTS

| 3,300,196 | 1/1967 | Bendy | 263/32 |
| 3,743,697 | 7/1973 | Jones | 423/175 |
| 3,991,172 | 11/1976 | Wicke et al. | 423/637 |
| 4,236,960 | 12/1980 | Hultman et al. | 162/30 K |
| 4,283,202 | 8/1981 | Friis-Hansen | 23/230 |
| 4,302,281 | 11/1981 | Ryham | 423/DIG. 3 |
| 4,311,666 | 1/1982 | Hultman et al. | 422/62 |
| 4,391,671 | 7/1983 | Azarniouch | 423/637 |
| 4,536,253 | 8/1985 | Bertelsen | 162/30.11 |
| 4,748,010 | 5/1988 | Walker | 423/175 |

FOREIGN PATENT DOCUMENTS

| 1648770 | 4/1976 | Fed. Rep. of Germany . |
| 7903919 | 12/1979 | Sweden . |
| 7807910 | 2/1980 | Sweden . |
| 1152942 | 4/1985 | U.S.S.R. . |

Primary Examiner—Peter Kratz
Attorney, Agent, or Firm—Bernard, Rothwell & Brown

[57] ABSTRACT

Method and apparatus for controlling the reactivity of lime produced in a lime cycle process that includes the steps of forming burnt lime in a kiln, washing and filtering of lime sludge, and causticizing of green liquor, which lime cycle process steps are carried out under variable operating conditions. At least one mechanical property of the burnt lime is measured, and at least one operating condition of the lime cycle process is adjusted, based on the measured mechanical property of the burnt lime, so as to thereby control the reactivity of lime produced in the lime cycle process.

21 Claims, 2 Drawing Sheets

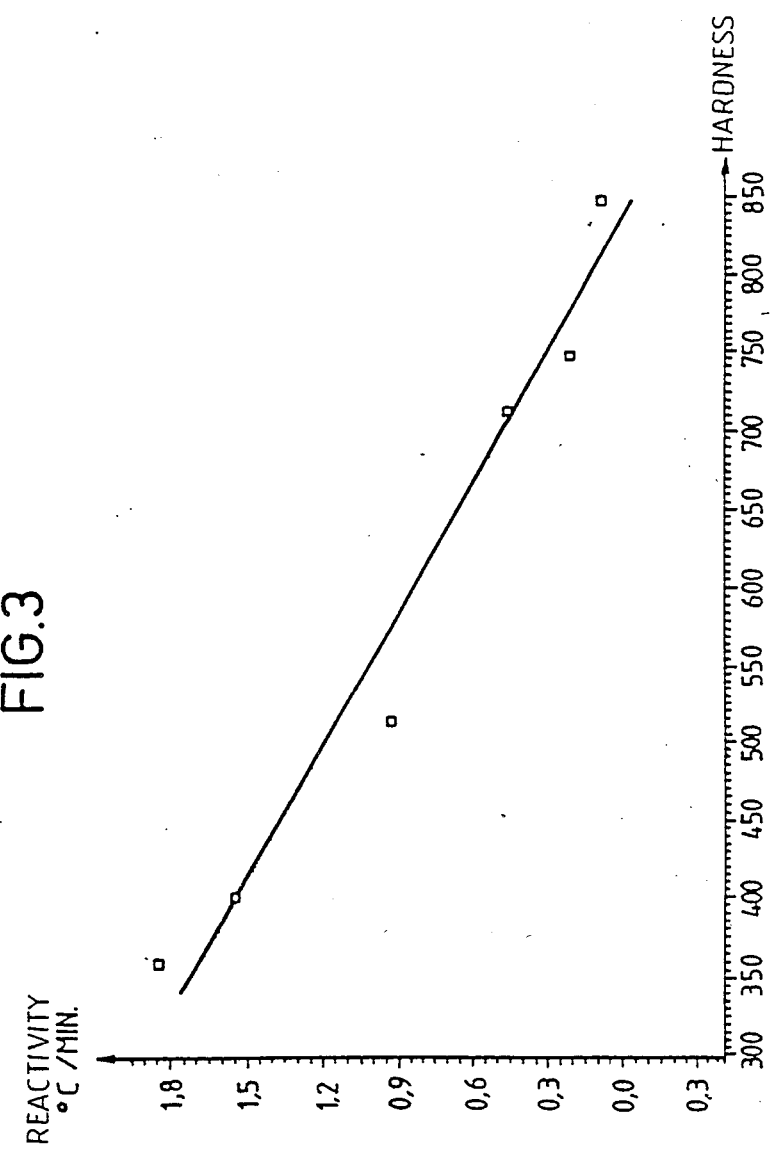

PROCESS AND APPARATUS FOR CONTROL IN BURNING AND SLAKING OF LIME AND CAUSTICIZING

This invention relates to a method for controlling processes in connection with burning and slaking of lime and causticizing, said processes comprising lime burning in a kiln, washing of lime sludge on a lime sludge filter and a slaking and causticizing process. These processes constitute the so-called lime cycle which is an essential part of the process for production of paper pulp according to the sulphate process. The invention also comprises a device for carrying out the above-mentioned control processes.

TECHNICAL FIELD—USE OF THE INVENTION

It is the object of the invention to maintain optimal operating conditions in production of lime having a desired quality and in using this lime. The following specification concerns the use of the invention in the sulphate pulp industry. Besides this use the invention can be utilized in burning of lime for other purposes where an intended lime quality according to the following specification is desired.

In production of sulphate pulp lime, i.e. CaO, is used for preparation of boiling liquid. The lime is handled in a cycle of processes, i.e. the lime cycle. Lime is batched together with green liquor in a slaker which is the first vessel in a causticizing plant. Green liquor is causticized to white liquor in the slaker and in the following reaction vessel, also called causticizing tank, meaning that carbonate in the solution is converted into hydroxide and that the lime forms $CaCO_3$, so-called lime sludge. The lime sludge is separated from the white liquor, is dewatered and washed e.g. on a lime sludge filter and thereafter burnt to lime which is utilized again for causticizing.

Today lime sludge is almost exclusively dried and reburnt in rotary furnaces, so-called lime kilns. This is a process requiring much energy which is of decisive importance for the energy economy of the sulphate pulp mill. Fuel, often oil, is fired in such kilns. Normally the energy consumption is about 200 kg oil per metric ton lime corresponding to 40–45 kg per metric ton produced pulp.

Lime sludge ($CaCO_3$) is disintegrated in the lime kiln to carbon dioxide ($CO_2$) and lime (CaO) at temperatures above 900° C. When the burnt lime is subjected to higher temperatures (1100°–1400° C.) its structure is changed—it sinters. If the lime sludge contains impurities, preferably sodium, sintering may occur at lower temperatures than 1100° C. The impurity content of the lime sludge in this respect is decided by the efficiency of the lime sludge filter.

Sintering means that the porosity of the lime and its specific surface are reduced and the reactivity of the lime is impaired in slaking. Sintering also involves influence on the mechanical properties of the lime such as hardness and modulus of elasticity. This is not specific to burning of lime sludge but always occurs when burning materials containing $CaCO_3$ and/or $MgCO_3$.

The quality of the burnt lime is of a great importance for the pulp production. An even and good lime quality is a prerequisite for a satisfactorily working causticizing process. The result of that process decides the quality of the white liquor, i.e. that of the boiling liquid, which in turn will influence both quality and production costs of the pulp. The lime must not be burnt too hard nor too loose. Lime that has been burnt too hard has a bad reactivity in slaking, e.g. the slaking rate is low which will influence the preparation of white liquor negatively while lime that has been burnt too loose has a low CaO-content and, moreover, yields a lime sludge that is difficult to separate from the white liquor and to dewater e.g. on a lime sludge filter.

Thus, both the reactivity of the lime and its CaO-content will influence the result of the causticizing. The CaO-content in lime sludge will not vary inconsiderably under normal circumstances provided the lime is finally burnt, e.g. its $CaCO_3$-content is low. On the other hand, the reactivity of the lime can vary considerably. As mentioned above the reactivity of the lime is primarily dependent on the conditions in the kiln—temperature and residence time—and the purity of the lime sludge. As the same factors decide the mechanical properties of the lime it is possible to balance the reactivity variations of the lime sludge lime by measuring a suitable mechanical property of the lime and controlling the lime kiln and/or the impurity content of the lime sludge so that a certain desired value is obtained for the measured quantity. As the measured value is a measure of the reactivity of the lime in slaking, it can be used in causticizing for adapting batching of lime or, as an alternative, green liquor, to the current lime quality.

PRIOR ART

Normally the method for control of the processes in the lime cycle, i.e. adjustment of the slaking and causticizing process, of lime sludge washing on e.g. washing filters and of the lime sludge kiln, consists of maintaining the flow at a constant.

Control of slaking-causticizing is then carried out by adjusting the inflow of green liquor and lime, respectively, to a certain nominal value. The nominal values are adjusted manually so that a desired amount of white liquor is obtained on the basis of laboratory analyses of the composition of the resulting white liquor. In a more advanced method, the nominal values are adjusted on the basis of continuously obtained measured values in respect of the increase of temperature in slaking-causticizing and/or the electric conductivity of the liquid. Adjustment of nominal values by means of measured values from equipment for automatic analysis of chemical components in the liquid, preferably carbonate content, is also used.

Washing of lime sludge is normally controlled so that the amount of washing liquid supplied is adjusted to a certain nominal value that in certain cases is proportioned to the inflow of lime sludge.

The lime kiln is normally adjusted by adjusting the inflow of fuel, combustion air and lime sludge, respectively, to certain nominal values which are regulated in a certain mutual relation. According to more advanced methods these nominal values are adjusted utilizing a continuous measurement of temperature in the kiln—in certain cases the temperature in different parts of the kiln—and a continuous measurement of the content of, e.g. oxygen gas, of the flue gas. The nominal values are adjusted at relatively long time intervals on the basis of manually performed laboratory analyses of the composition of the resulting lime, preferably on the basis of the content of calcium carbonate, $CaCO_3$, of the lime.

Furthermore a process is described in Swedish patent No 7903919-4 according to which the lime kiln is adjusted on the basis of an automatically obtained measured value corresponding to the reactivity of the lime. The measured value is the increase in temperature obtained when mixing the lime e.g. with water.

The reported examples of existing technology to maintain a good function of the lime cycle processes are more or less good examples of how one tries to reduce operating problems in the processes. The existing solutions often mean suboptimizations of the lime cycle processes in such a way that they reduce the effects of certain parameter variations but have no or little effect on other variations. For instance, none of the processes described takes variations in the structure of the lime or its sintering into consideration which, as shown, are important points for the operating conditions.

REPORT ON THE ADVANTAGES OF THE INVENTION

The quality of the lime is the process variable that is of a decisive importance for the function of the different processes parts in the lime cycle. Studies have shown that the reactivity of the lime in slaking, i.e. its reaction rate in the slaking reaction, is the most important quality point for the whole process. The same mechanism, influencing the reactivity of the lime in burning, also influences its mechanical properties. Studies have now also shown that the mechanical properties of the lime, e.g. its hardness or modulus of elasticity, are in a given relation to the reactivity and, thus, it is possible to utilize a measurement of the mechanical properties of the lime to obtain a measure of the quality of the lime. It has been found that the mechanical properties of the lime can be used as a variable of adjustment to regulate the process conditions in the process steps of the lime cycle.

The main purpose of the invention is to obtain a measuring signal by using a quick and flexible measuring method for lime quality and to utilize this as a true value in control systems for the lime cycle where the function of the control system is to influence the process conditions in the lime cycle when disturbances and changes with consequences for the quality of the lime arise.

In this way a lime having a high and even quality can be produced. It is meant by a high lime quality, when production of lime sludge lime in a sulphate pulp mill is concerned, a lime quality that is optimal in the following aspects:

energy consumption in the lime kiln
efficiency of the conversion of the carbonate content of the green liquor into hydroxide in white liquor separating ability for resulting lime sludge.

Tests in which the reactivity, i.e. the slaking rate, and mechanical properties have been measured for the same lime, have now shown unambiguously that there is a clear relation between the mechanical properties of the lime and its reactivity. How this connection looks is of course due to how the slaking rate and the mechanical properties are measured. It is possible according to the invention to utilize this connection in a process of the kind mentioned in the introductory section. At least one of the mechanical properties of the finally burnt lime, e.g. modulus of elasticity or hardness, is measured directly or indirectly and this property or quantity, which indicates a measure of the kiln efficiency in the burning process and the reactivity in the slaking process, is used for adjusting the operating conditions in the kiln, in the lime sludge washing, e.g. on lime sludge filters, and/or in the causticizing plant. A device for adjusting processes in the lime cycle, when carrying out the above method, is characterized in, according to the invention, that it comprises a measuring apparatus for direct or indirect measurement of at least one of the mechanical properties of the burnt lime, e.g. modulus of elasticity or hardness. An adjusting unit, optionally via a process computer, utilizes the output signal of the measuring apparatus to vary the properties of the final lime product by adjusting the operating conditions in at least one of the following: in the lime kiln, in washing of lime sludge, and/or in a slaking and causticizing plant.

LIST OF DRAWINGS

FIG. 3 shows a diagram illustrating a measured relation of a mechanical property to the reactivity of the lime in slaking, the apparatus according to FIG. 2 being utilized.

EMBODIMENTS

What is essential in the invention is the method of providing a signal which is a measure of the mechanical properties of the lime and consequently also its reactivity. It is specific to the invention that this signal is utilized as a true value in control of the processes in the lime cycle. Some alternatives specifying how the control process of the invention can be built up will be indicated here and the general embodiment is first described.

Figure 1:
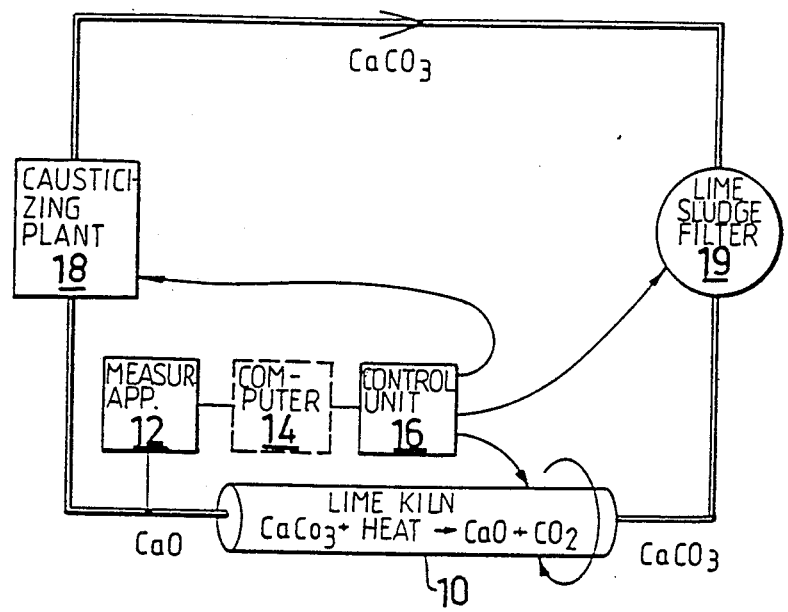
FIG. 1 shows a block diagram illustrating the fundamental embodiment of control systems for the part processes of the lime cycle, i.e. adjustment of the burning process in a lime kiln, washing of lime sludge on e.g. a lime sludge filter and/or the causticizing process.

Burning of $CaCO_3$ to lime is carried out in the kiln 10 in FIG. 1 under supply of heat. The measure of the properties of the lime essential for the invention is obtained by means of an apparatus 12 by which the mechanical properties of the lime are measured. The apparatus 12 can for instance be of the type shown in FIG. 2. The output signal from the apparatus is either connected directly, or via a process computer 14, to a control unit 16. The control unit 16 can operate to vary the properties of the final lime product by adjusting operating conditions in at least one of the following: in the lime kiln 10, in the causticizing plant 18, and/or in the lime sludge washing on e.g. the lime sludge filter 19. The existing process conditions are considered in the process computer 14.

The regulator can preferably have the character of PI or PID and can be designed for analogue or digital technique with the corresponding PI or PID algorithms.

Control systems for the processes of the lime cycle can be embodied in several ways with access to the measuring signal for the mechanical properties of the lime as true value.

One method is that the measured value obtained is connected as true value in a control circuit, the output signal of which is connected to a means for adjusting the fuel supply to the kiln. The nominal value of the lime property can be adjusted manually or be obtained from a superordinated control circuit. The stability of the adjustment can be improved by connecting instead the output signal of the control circuit to the input of the nominal value of a control circuit for adjusting the temperature in the kiln, the output signal from this interior temperature control circuit being connected to an adjusting means for fuel supply. The output signal of the temperature control circuit can be alternatively connected, optionally via an interior control circuit, to an adjusting means for the flow of flue gas through the kiln or to an adjusting means for the inflow of combustion air. The temperature control circuit can alternatively consist of a multivariable adjusting means by which several of the adjusting means as above can be utilized coordinately.

One method is that the measured value is connected as true value to a control circuit, the output signal of which is connected directly or via an interior control circuit to an adjusting means for the speed of a motor by which the kiln is rotated.

One method is that the measured value is connected as true value to a control circuit, the output signal of which is transferred directly or via an interior control circuit to the adjusting means for the liquid flow to the lime sludge washing.

One method is to connect the measured value as true value to a circuit for advance control, the output signal of which is connected directly or via an interior control circuit to an adjusting means for the flow of green liquor to the slaker or to an adjusting means for the flow of cooling water through a cooler for green liquor or for the flow of steam through a heater for green liquor.

The above is examples of various embodiments of control according to the invention. The different measures can be combined and varied in different ways within the inventive idea.

The method that is at present considered to give the best performance is a combination of the described way of connecting the measured value of the mechanical properties of the lime as a true value to an adjusting circuit for fuel supply via an interior control circuit for kiln temperature and the described way of utilizing a control circuit for advancing the flow of green liquor to the slaker.

Figure 2:
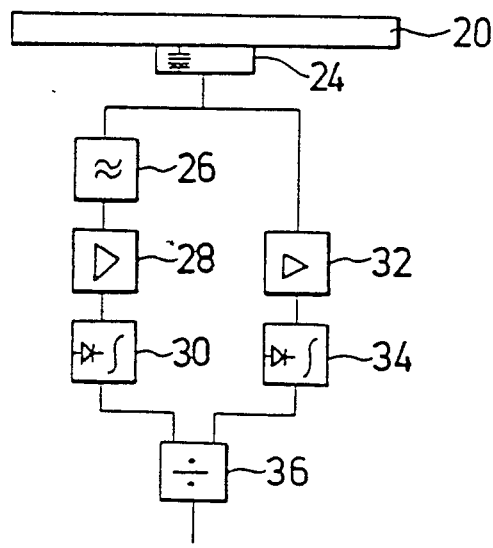
FIG. 2 shows schematically a measuring apparatus for hardness measurement useful in connection with the control arrangement illustrated in FIG. 1.

In FIG. 2 an example is shown specifying how an apparatus for indirect measurements of hardness can be designed. The apparatus 12 comprises a metal plate 20 seen laterally which per se can be part of the lime handling system. A piezoelectric crystal 24 is attached to the plate 20. The crystal 24 is electrically connected to two separate signal branches. The first signal branch comprises in series a high pass filter 26, an amplifier 28 and a rectifier and integrator 30. The second signal branch comprises in series an amplifier 32 and a rectifier and integrator 34. A comparator 36 is connected to the two signal branches.

When the metal plate 20 is hit by a small lime ball mechanical waves are generated in the plate. The frequency spectrum of the waves comprises the basic frequency specific to the plate 20 as well as superimposed tones. It is found that the content of high frequencies is greater when the plate 20 is hit by a hard sintered ball than when it is hit by a softer normally burnt ball. At vibrations the piezoelectric crystal will generate a varying voltage and the output signal from the crystal is made to pass through both signal branches. The signal is filtered through a high pass filter in the first signal branch, the basic frequency being eliminated, after which the signal is amplified, full wave rectified and integrated. In this way a measure is obtained specifying how much energy is present in the high-frequency mechanical waves. The signal is treated in the same way in the second signal branch except for the filtration in the high pass filter, after which the quotient of the signals received from the signal branches is calculated. "The overtone content" of the vibrations in the plate, i.e. the share of the total energy in the mechanical waves consisting of high frequencies, is then obtained.

In order to avoid the influence of odd measured values caused by disturbances of different kinds and to obtain such a representative output signal as possible, it is suitable to form continuously mean values of a number of measurements, e.g. between 10 and 100 separate measurements.

The distribution of the mechanical waves on different frequencies when a surface is hit by lime nodules of a varying quality can be utilized in several different ways. In addition to producing the overtone content in the way described above the quotient of two suitably selected frequency bands can be used. Moreover, it is possible only to measure the energy content of a selected frequency band without calculating the quotient. The way in which these bands are selected is largely dependent on the properties of the surface.

One reason for a different great share of high frequencies being generated in a surface of different hard limes is that the contact time between lime and surface varies. One alternative of utilizing the frequency spectrum is therefore to measure the contact time.

An alternative way of measuring the vibrations of a surface consists in using a microphone to detect the acoustic waves caused by the vibrations. If a microphone is used the lime can be made to fall against a surface completely damped. In this case the measured acoustic waves substantially derive from the lime nodule. In the same way as before the content of high frequencies separates a hard burnt lime from a soft one, and therefore the same signal processing can be utilized.

Of course the measuring device can also be formed in another way, measurement being carried out e.g. with respect to the work required at mechanical influence on the lime. Such mechanical influence can consist of compression, crushing, grinding, or of the work performed when a body is made to penetrate into the lime.

In FIG. 3 a relation between the hardness of the lime measured by the measuring device and the reactivity of the lime at slaking water is reported. This relation shows that the signal from the measuring device indicates a measure of the quality of the lime relating to its reactivity at slaking.

We claim:

1. A method of controlling at least one process step in a lime cycle process that includes the steps of forming burnt lime in a kiln, washing and filtering of lime sludge, and causticizing of green liquor, which lime cycle process steps are carried out under variable operating conditions, said method including the steps of obtaining a value for at least one mechanical property of said burnt lime, said mechanical property being selected from the group consisting of modulus of elasticity and hardness, and adjusting at least one operating condition of said lime cycle process based on the value obtained of said mechanical property.

2. The method of claim 1 wherein operating conditions in said kiln are adjusted based on the measurement of said mechanical property.

3. The method of claim 1 wherein operating conditions during washing of said lime sludge are adjusted based on the measurement of said mechanical property.

4. The method of claim 1 wherein operating conditions during said causticizing of green liquor are adjusted based on the measurement of said mechanical property.

5. The method of claim 1 wherein said adjusting step includes adjusting the amount of fuel supplied to the kiln during the step of forming burnt lime in the kiln.

6. The method of claim 1 wherein said adjusting step includes adjusting combustion gas flow through the kiln during the step of forming burnt lime in the kiln.

7. The method of claim 1 wherein said adjusting step includes adjusting purity of lime sludge fed into the kiln for forming burnt lime in the kiln.

8. The method of claim 1 wherein said adjusting step includes adjusting lime flow in said causticizing step.

9. The method of claim 1 wherein said adjusting step includes adjusting green liquor flow in said causticizing step.

10. The method of claim 1 wherein the measurement of said at least one mechanical property of the burnt lime is indirect, and is carried out by bouncing a burnt lime nodule against a hard surface and detecting contact time between the lime nodule and said hard surface.

11. The method of claim 1 wherein the measurement of said at least one mechanical property includes the steps of contacting a surface with lime nodules of a predefined size and measuring mechanical waves formed when said lime nodules contact said surface.

12. The method of claim 11 wherein said measurement measures distribution of mechanical waves on different frequencies.

13. The method of claim 11 wherein a ratio of energy present in two predetermined frequency bands is measured, one of said frequency bands being selected so that it corresponds to total energy of said mechanical waves.

14. The method of claim 11 wherein energy content of a defined frequency band is measured.

15. The method of claim 1 wherein said measuring step is comprised of measuring the energy consumption required to compress, crush, grind or penetrate the burnt lime.

16. The method of claim 15 wherein the burnt lime is in the form of nodules, and the energy consumption is measured on one lime nodule at a time.

17. The method of claim 15 wherein energy consumption is measured for a predetermined amount of time.

18. A device for carrying out a lime cycle process and for controlling at least one process step in said lime cycle process, comprising a kiln for forming burnt lime, means for washing and filtering of lime sludge, and means for causticizing of green liquor, which lime cycle process is carried out under variable operating conditions, said device further comprising means for obtaining a value for at least one mechanical property of said burnt lime, said mechanical property being selected from the group consisting of modulus of elasticity and hardness, and for providing an output signal corresponding to the value obtained for the mechanical property, and adjustment means for utilizing said output signal to adjust at least one operating condition of the lime cycle process based on the value obtained of said mechanical property.

19. The device of claim 18 wherein said adjusting means includes a process computer that utilizes said output signal to adjust said operating conditions.

20. The device of claim 18 wherein the measurement means measures modulus of elasticity of the burnt lime.

21. The device of claim 18 wherein the measurement means measures hardness of the burnt lime.

* * * * *